June 6, 1961 U. S. BERGER 2,987,586

CROSS-MODULATION MEASURING SYSTEM

Filed Sept. 30, 1958 3 Sheets-Sheet 1

INVENTOR
U. S. BERGER
BY J. P. Kearns, Jr.
ATTORNEY

INVENTOR
U. S. BERGER
BY J. P. Kearns, Jr.
ATTORNEY

June 6, 1961 U. S. BERGER 2,987,586

CROSS-MODULATION MEASURING SYSTEM

Filed Sept. 30, 1958 3 Sheets-Sheet 3

INVENTOR
U. S. BERGER
BY J. P. Kearns, Jr.
ATTORNEY

United States Patent Office 2,987,586
Patented June 6, 1961

2,987,586

CROSS-MODULATION MEASURING SYSTEM

Uriah S. Berger, Andover, Mass., assignor to Bell Telephone Laboratories, Incorporated, New York, N.Y., a corporation of New York Filed Sept. 30, 1958, Ser. No. 764,428
8 Claims. (Cl. 179—175.3)

This invention relates to multichannel carrier communication systems and specifically to improvements in the measurement of interchannel cross-modulation in such systems.

The study of cross-modulation or crosstalk among the several channels of broadband carrier telephone systems has been limited in the past to a consideration of a few channels at a time. For example, the output of a white noise source, that is, one having frequency components of uniform amplitude over a wide frequency range, has been applied to all but one channel of a channel bank while the input to that one channel is blocked by a band-rejection filter. Measurements made at the output of the channel with the blocked input are then made and any energy detected in that channel may be logically ascribed to crosstalk from one or more of the other channels. By changing blocking filters at the inputs of the successive channels and making output measurements in these channels, a measure of the crosstalk resulting in all channels may be obtained. Normally, however, because of the necessity of changing input filters and output connections channel by channel over a large number of channels, the making of a complete set of crosstalk measurements for a bank of several hundred channels is a tedious and time-consuming procedure. It has therefore been the practice when employing this method to limit the measurement of crosstalk to a few channels at each of the high and low ends of the channel bank and let the remaining channels go essentially unnoticed, particularly if no abnormalities are detected in the first few channels actually tested.

The object of this invention is to eliminate the above-mentioned drawbacks of the prior art and to make possible the rapid measurement of interchannel cross-modulation in a multichannel carrier telephone system on all channels.

Another object is to simplify the evaluation of crosstalk among channels of a carrier telephone system by producing a simultaneous visual display of the crosstalk energy in all channels.

A further object is to speed up the measurement of interchannel crosstalk in a carrier telephone transmission system.

In accordance with an illustrative embodiment of the invention described in more detail below, the output of a white noise source is simultaneously applied to all channels of a multichannel carrier telephone system and then is cyclically swept by a moving slot approximately two channels in bandwidth while the output of the channel corresponding to the instantaneous position of the slot is synchronously monitored in step with the moving slot and the crosstalk energy is displayed on a cathode ray oscilloscope. The function of the moving slot is successively to block from the input of each channel the output of the noise source so that the crosstalk energy resulting in each channel may be observed visually. The moving slot is generated in such a way that fixed filters only are required in the measuring system. On the other hand, for the purpose of observing the crosstalk energy in a single channel the sweeping oscillators in the sending and receiving portions of the apparatus may be adjusted manually to the source frequency and thereby employ to good advantage the fixed filter arrangement of the invention.

A feature of the invention is that no filter adjustments or interchange of filters is required in order to observe crosstalk in each and every channel of a carrier telephone transmission system. A further feature of the invention is that the moving slot is introduced by means of a single fixed band elimination filter and the slot is moved slowly enough across the transmission band to permit full energy buildup in each channel.

A more complete understanding of the invention may be had from a consideration of the following detailed description and the several drawings, in which.

Figures 1, 4:
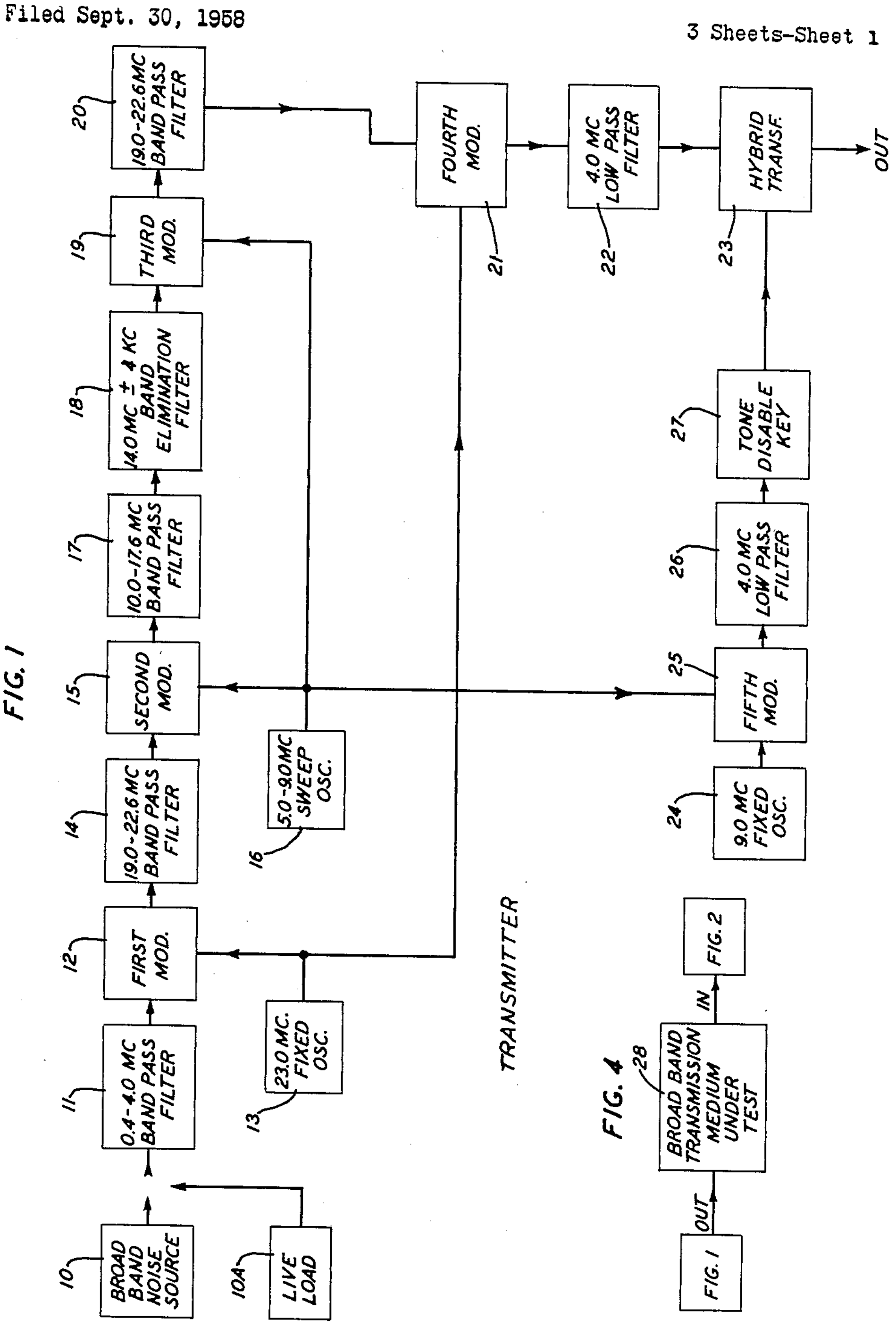
FIG. 1 illustrates diagrammatically a circuit according to the invention for generating a noise signal having a moving slot interposed therein.
FIG. 4 is a diagram of the relationship of FIGS. 1 and 2 to a carrier telephone transmission medium under test.
Figure 2:
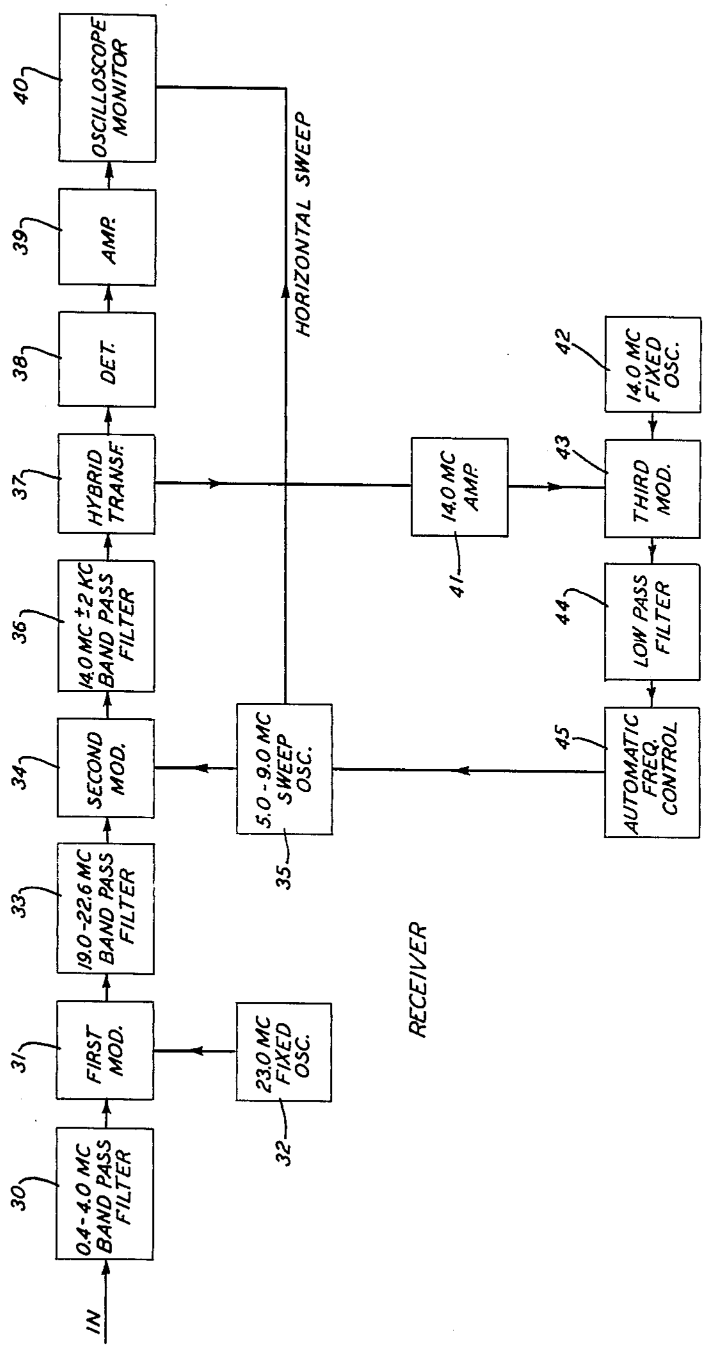
FIG. 2 illustrates diagrammatically a circuit according to the invention for detecting and displaying the crosstalk energy for all message channels.

A complete interchannel crosstalk measuring system embodying the invention comprises a transmitter as diagrammed in FIG. 1 and a receiver as diagrammed in FIG. 2. As shown in FIG. 4, the transmitter of FIG. 1 has its output connected to the sending end of a broadband carrier telephone transmission medium 28 and the receiver of FIG. 2 has its input connected to the receiving end of the medium. The medium 28 may be any type of transmission medium, such as an open wire line, coaxial cable, or radio link between sending and receiving terminals, and may further include repeater stations. The invention is, of course, not limited in its application to any particular mode of carrier wave transmission. Carrier transmission is herein intended to mean transmission by a plurality of individual message channels adjacent to each other in the frequency spectrum on a frequency division basis. In the following description of a practical embodiment according to this invention certain specific frequency ranges are employed. It is to be understood that these frequency ranges are merely illustrative and that a person skilled in the art would be able by appropriate choice of other frequency ranges to adapt the system of the invention to the transmission band of the specific transducer to be tested.

Let it be assumed that the broadband transmission medium under test has substantially a four megacycle per second bandwidth and that in this band are contained a plurality of four kilocycle per second message channels. FIG. 1 then illustrates a circuit for generating a test signal for testing the interchannel crosstalk in all of the plurality of four kilocycle per second message channels in the four megacycle per second transmission bandwidth of the transducer under test. Broadband noise source 10, having a theoretically infinite bandwidth and producing a composite output of substantially uniform power level at all frequencies, comprises the input to the system. Any of several well-known broadband thermal noise generators may be used so long as the generator chosen has substantial power in the transmission band of the medium under test. In the alternative, lacking a white noise source as indicated by block 10, a so-called "live load" 10A may serve as the input to the system. The live load may be the output of a master group of a broadband telephone terminal, for example.

Whichever of sources 10 or 10A is used, the output is first applied to a bandpass filter 11 which passes substantially all frequencies in the range of the medium under test. In this embodiment the range is assumed to extend from 0.4 to 4.0 megacycles per second and thereby to encompass up to about 900 message channels of four kilocycles per second bandwidth. The band limited output of filter 11 is applied to one input of a first modulator or mixer 12 and the fixed output of an oscillator 13 operating at a frequency of 23 megacycles per second is applied to another input of the same modulator 12 whereby there appear in the output of modulator 12 an upper sideband extending from 23.4 to 27.0 megacycles per second and a lower sideband extending from 19.0 to 22.6 megacycles per second. These two sidebands are applied together to the input of bandpass filter 14 which is adapted to pass only the above-mentioned lower sideband and therefore to reject the upper sideband.

Figure 3:
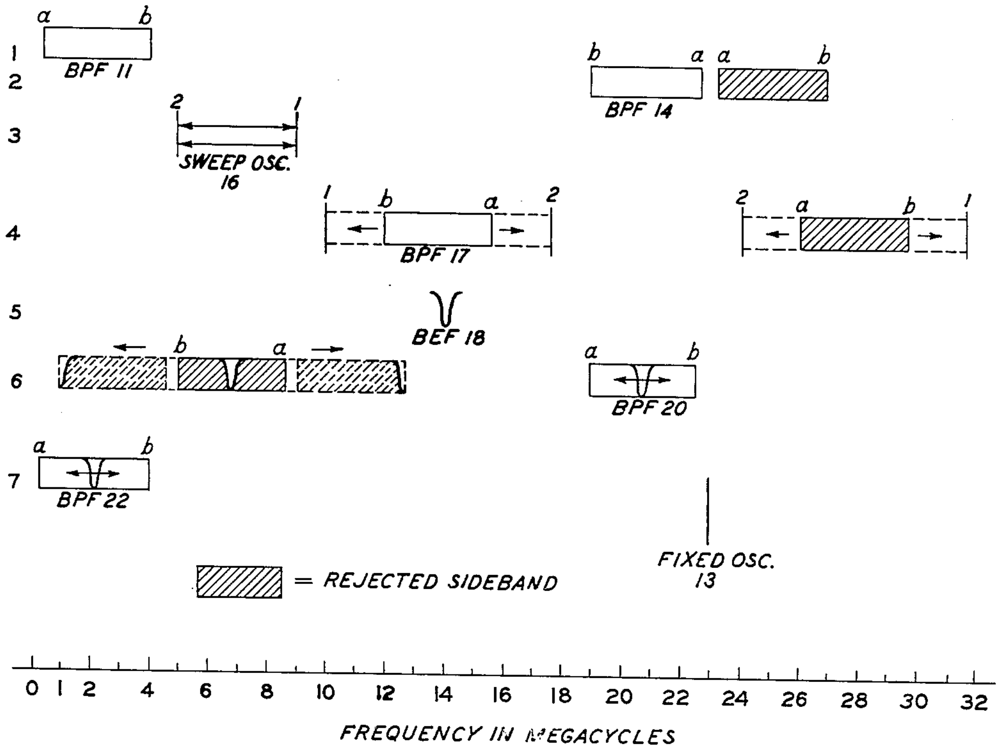
FIG. 3 is a diagram showing the frequency bands used in the several filters of the measuring system of the invention.

In order to make it easier to visualize the several frequency translations involved in the system of the invention, a frequency chart is provided in FIG. 3. A frequency scale in megacycles per second is provided at the bottom of the chart. The vertical scale is arbitrary and is marked by figures adjacent to the several lines of the chart and denoting the steps of modulation employed. On line 1 there appears a single block designated "BPF 11" to indicate the frequency range passed by filter 11 in FIG. 1. The lower case letters "*a*" and "*b*" at the upper corners of the block are for reference as an aid in following the turnover in the sidebands at the several modulation steps. On line 2 of FIG. 3 are shown two blocks. One is an open block bearing the legend "BPF 14" beneath; and the other, a cross-hatched block. The open block in line 2 shows the translated position on the frequency scale of the 0.4 to 4.0 megacycle per second baseband chosen by filter 11 from the input source 10 after modulation with the output of oscillator 13 and further selection by filter 14 as previously discussed. The cross-hatched block indicates the position of the upper sideband produced in modulator 12 but rejected by filter 14. The leters "*a*" and "*b*" show that the relative positions of the upper and lower frequency components of the baseband have been reversed by the modulation action.

The 19.0 to 22.6 megacycle per second sideband selected by filter 14 is applied to the input of the second modulator 15, which has also applied to its other input the output of a swept frequency oscillator 16. The latter oscillator sweeps over a four megacycle per second band in a range of 5.0 to 9.0 megacycles per second, for example, in the specific embodiment shown in FIG. 1 and as indicated on line 3 of FIG. 3. The mixing action of modulator 15 converts the lower sidebands selected by filter 14 from the range of 19.0 to 22.6 megacycles per second to an extended range of 10.0 to 17.6 megacycles per second, as indicated on line 4 of FIG. 3. There is also produced at the same time an upper sideband extending over the range of 24.0 to 31.6 megacycles per second as further shown by the cross-hatched blocks on line 4 of FIG. 3. The latter sideband is subsequently rejected. Both sidebands are continually moving back and forth at the sweeping rate of the oscillator 16 between the extreme positions marked 1 and 2, and effectively it is the original baseband of the source spectrum that is being so shifted up and down the frequency scale.

The output of modulator 15 is applied to a bandpass filter 17 which serves to pass the desired sideband lying in the range of 10.0 to 17.6 megacycles per second and to reject the undesired upper sideband. The output of bandpass filter 17 is next applied to the input of a band-elimination filter 18, which has a center frequency at 14.0 megacycles per second. Filter 18 is a fixed narrow band device, having a bandwidth in the order of a few message channels, for example 8 to 10 kilocycles per second, which may be designated $\Delta$. The location of filter 18 on the frequency scale is shown on line 5 of FIG. 3. The action of sweeping the baseband spectrum through the fixed band-elimination filter 18 effectively introduces a slot or notch in that baseband, the position of which is constantly changing from one location to another relative to the limits of the baseband, although fixed on the absolute frequency scale.

After having introduced a slot into the moving baseband noise spectrum by passing the frequency-shifting baseband through the fixed the band-elimination filter 18, it is now necessary to stop the frequency movement of the spectrum. This is accompished by remodulating the moving spectrum with the output of sweep oscillator 16 in the third modulator 19. Thus, modulator 19 has the combined outputs of filters 17 and 18 applied to one of its input points and the output of sweep oscillator 16 to its other input point. The output of modulator 19 therefore includes a fixed upper sideband extending over the range of 19.0 to 22.6 megacycles per second and a moving lower sideband extending over the range of 3.6 megacycles per second but constantly shifting between the extremes of 1.0 to 12.6 megacycles per second as indicated on line 6 of FIG. 3. The upper sideband as a whole remains fixed because the swept oscillator components added in the second modulator 15 are exactly canceled in third modulator 19. However, the frequency components eliminated by filter 18 are for the first time combined with the sweep oscillator output and therefore appear to be moving back and forth across the upper sideband. On the other hand the lower sideband on line 6 of FIG. 3 results from a double subtraction of the sweep oscillator output. The slot in the lower sideband sweeps from 10.0 to 12.6 megacycles per second and is of no further use.

Accordingly, bandpass filter 20 is located at the output of third modulator 19 to select the stationary upper 19.0 to 22.6 megacycle per second sideband which now has a slot moving continuously back and forth across this band. It is now necessary to return the output of filter 20 to the original baseband. This is accomplished by mixing the output of filter 20 with the output of the 23.0 megacycle per second fixed oscillator 13 in a fourth modulator 21. The output of modulator 21 includes a lower sideband in the original baseband of 0.4 to 4.0 megacycles per second and an upper sideband (not shown in FIG. 3) in the frequency range of 42 to 45.6 megacycles per second. The lower of these two sidebands is passed, and the upper sideband is rejected by low-pass filter 22. The original noise signal, now containing the moving slot, has been translated back to its original baseband position as shown on line 7 of FIG. 3. For the purpose of connecting the output of the filter 22 to the transmission medium under test a hybrid transformer 23 is provided.

Discussion of the remaining blocks 24, 25, 26 and 27 shown in FIG. 1 which are used for synchronizing and calibrating the transmitter and receiver sections of the measuring system is found hereinafter.

The output of hybrid transformer 23 is connected to the medium under test, as previously mentioned. The composite white noise spectrum is transmitted through this medium, the appropriate part of the spectrum being transmitted in the respective portions of the transmission band normally occupied by the respective message channels. The position of the slot moving back and forth across the transmission band spectrum is such that all channels of the band are blocked at some time during the sweep cycle. Therefore, any energy emerging from the far end of the medium at the time that the slot is blocking that portion of the transmission band must be due to cross-modulation from adjacent portions of the band not then blocked by the moving slot.

It is in accordance with this concept that the receiver shown in FIG. 2 is constructed. The output of the far end of the transmission medium under test is applied to the input of the receiver section at the arrow marked IN through the bandpass filter 30. It is the function of the receiver effectively to stop the movement of the slot across the transmission band of the transmission medium and to monitor the energy induced in this slot by the cross-modulation, if any, occurring in the tranmission medium. Therefore, as a first modulation step, the incoming signal, limited to the original frequency band of interest by filter 30, is applied to one input of first modulator 31 while the output of a fixed 23.0 megacycle per second oscillator 32 is applied to the other input of modulator 31. The mixing action occurring in modulator 31 results in a translation of the baseband of frequencies to the 19.0 to 22.6 megacycle per second level exactly as in the transmitter section shown in FIG. 1, as previously described. The output of modulator 31 is passed through bandpass filter 33 for the purpose of selecting the 19.0 to 22.6 megacycle per second sideband and to reject all others.

A second modulation step is required in the receiver of FIG. 2 as in the transmitter of FIG. 1, but in this case for the purpose of stopping the movement of the slot. One input of second modulator 34 accepts the 19.0 to 22.6 megacycle per second output of filter 33; and the other input, the output of a 5.0 to 9.0 megacycle per second sweep frequency oscillator 35. Of the several sidebands occurring in the output of modulator 34, one contains the slot which at this time has stopped its movement and is centered on a frequency of 14.0 megacycles per second while the remainder of the band sweeps above and below this center frequency. Accordingly, modulator 34 is followed by a fixed frequency bandpass filter 36 to which the output of modulator 34 is applied. This filter 36 is approximately complementary to filter 18 as used in the transmitter section of FIG. 1, except that the passband of filter 36 is arbitrarily narrowed to about one-half the rejection band of filter 18, that is $\Delta/2$. This is done to overcome possible inaccuracies in the results obtained due to lack of perfect synchronization between the transmitter and the receiver whereby spurious noise may be induced into the frequency slot in the measuring process.

By arbitrarily narrowing the bandwidth of filter 36 at one-half that of filter 18, the receiver section of the measuring apparatus will be controlling and only the cross-modulation noise passed by the receiving filter will be measured. The output of filter 36 is passed through hybrid transformer 37 to detector 38 where the crosstalk energy is abstracted from the frequency slot. The detector 38 may be of any conventional type, such as for example a diode detector. The detected output of detector 38 is amplified as necessary in amplifier 39, which need only cover the audio range up to four kilocycles per second, since the detected signal comprises a low frequency alternating current superimposed on the direct current. The alternating portion of the detected signal corresponds to the crosstalk noise and the direct-current portion to the 14.0 megacycle per second carrier. The amplified output of amplifier 39 may be observed either on a power meter to show what cross-modulation energy has been introduced into the moving frequency slot by passing through the transmission medium under test, or it may be applied to the vertical deflection circuits of an oscilloscope as indicated by block 40. In the former case it would not be readily feasible to determine in what channels the crosstalk energy is being induced. In the latter case, it is necessary to provide means for synchronizing the receiver section and oscilloscope horizontal circuits with the transmitter section.

One possible means for synchronizing the transmitter and receiver sections, respectively, is shown in FIGS. 1 and 2. Other equally useful means may occur to one skilled in the art. However, in the illustrated synchronizing system, an additional fixed oscillator 24 operating at 9.0 megacycles per second is provided in the transmitter section as shown in FIG. 1. The output of this oscillator and also that of the 5.0 to 9.0 megacycle per second sweep oscillator 16 are mixed in fifth modulator 25, thereby producing a substantially sinusoidal output varying over the range of zero to 4.0 megacycles per second, as well as a higher frequency output which is of no further interest in this apparatus. The output of modulator 25 is therefore passed through low-pass filter 26 which cuts off at four megacycles per second in order to reject the undesired sideband. A key 27 is also interposed in the path of the synchronizing tone for the purpose of disabling this tone during the time that the measuring system is being set up. When the key 27 is closed, the synchronizing tone is combined with the test signal in hybrid transformer 23. Inasmuch as the moving frequency slot in the test signal is sweeping at the same rate as the synchronizing tone, the latter will appear to be a steady tone centered in the moving slot. Therefore, a combination test and synchronizing signal is transmitted over the medium under test from the output of hybrid transformer 23.

At the receiver the incoming signal is recovered and the synchronizing tone is used to control the frequency of the sweep oscillator 35 shown in FIG. 2. The synchronizing tone is held in the center of the moving slot as it traverses the transmission medium and the input sections of the receiver, and at the output of modulator 34 in the receiver is held at a steady 14.0 megacycles per second. The tone is further passed through filter 36 to hybrid transformer 37 which has one output connected to detector 38 as already described and a further output connected to 14.0 megacyle amplifier 41. The latter amplifier preferably as a band width of approximately $\Delta$. The output of amplifier 41 is mixed with the output of a 14.0 megacycle per second fixed oscillator 42 in third modulator 43. The lower sideband output of modulator 43 is therefore either direct current or a very low frequency audio tone, since the two input currents to modulator 43 are very nearly at the same frequency of 14.0 megacycles per second. The low-pass audio filter 44 to which the output of modulator 43 is connected rejects any higher frequencies generated in modulator 43. This low frequency or direct-current voltage is used to control the instantaneous frequency of sweep oscillator 35 through the automatic frequency control apparatus 45. The latter control may be of the well-known reactance tube or servo control types. By means of the synchronizing system just outlined, the sweep oscillator 35 in the receiver section of FIG. 2 is maintained in essentially exact synchronism with the sweep oscillator 16 located in the transmitter section as shown in FIG. 1.

A further output may be derived from the sweep oscillator 35 of FIG. 2 in the form of a linear saw-tooth voltage wave in a conventional manner and may then be employed as an external horizontal sweep voltage for the oscilloscope monitor 40 in the well-known manner.

Because of the large number of channels that are often found in carrier telephone systems, it has been found that a low sweeping rate is advantageous. The slot filter 18 in FIG. 1 has a relatively narrow bandwidth with respect to the entire spectrum of the channel bank being evaluated and a finite build-up time is required for energy found in the slot. To get an essentially full buildup of noise in a slot which is two channels or about eight kilocycles per second in bandwidth, noise must remain in the band for about 125 microseconds. If it is assumed that there are 600 or more voice channels in the channel bank spectrum, a full sweep would need to persist for a least 750,000 microseconds. A build-up time of this duration requires a very slow sweeping rate of about 1.3 cycles per second. A sweep rate this low is most conveniently achieved by employing a motor drive for the sweeping oscillator. Sweep oscillator blocks 16 and 35 in FIGS. 1 and 2, respectively, may be considered to include such motor drive, if used. Correspondingly, the oscilloscope monitor requires a long persistence phosphor on its screen. Even at this slow rate, however, the entire message channel spectrum is presented approximately once per second on the monitor and this yields results in all channels several orders of magnitude higher than the conventional method of plugging off channels in a telephone carrier terminal one at a time. By further well-known techniques the sweep voltage for the oscilloscope monitor may be delayed for the purpose of restricting the display to a desired number of channels less than all of them.

It is also possible, as will be immediately apparent to one skilled in the art, to examine an individual channel by stopping the sweep oscillators 16 and 35 and then manually adjusting them to the same frequency until the desired channel is reached. In this way all other channels are excluded from consideration. Effectively, a variable band-elimination filter and a variable bandpass filter are achieved by this means with fixed filter elements.

While this invention has been described in detail with reference to a specific embodiment of a telephone carrier transmission system, many modifications and applications of the system of this invention to other specific broadband transmission systems will occur to one skilled in the art within the scope of the following claims.

What is claimed is:

1. Apparatus for simultaneously displaying on a cathode ray oscilloscope screen cross-modulation in a multichannel broadband signaling system comprising means for generating a broadband signal having frequency components of uniform amplitude extending over the operating frequency range of said system, means for sweeping said signal across the input of a band-elimination filter adapted to reject frequencies over a bandwidth corresponding to approximately two channels of said system, means for applying said swept signal to the sending end of said system, means at the receiving end of said system for sweeping the received signal across the input of a bandpass filter adapted to pass only a frequency range of signals equal approximately to one channel of said system, means for synchronizing the sweeping of said received signal across said bandpass filter with the sweeping of said transmitted signal across said band-elimination filter, means for detecting the amplitude of the received signal passed by said bandpass filter, and means for displaying the detected signal on said cathode ray oscilloscope screen.

2. A cross-modulation evaluator for direct indication over the entire frequency spectrum of a multichannel broadband transmission medium comprising a source of current containing substantially all the frequencies of said spectrum, means for eliminating from said source current a relatively narrow band of frequencies with respect to said spectrum, means for cyclically sweeping said narrow band of frequencies across the transmission band of said medium, means for applying the output of said last-mentioned means to the input of said medium, and means at the output of said medium for detecting and monitoring only the energy lying in said moving narrow band of frequencies.

3. A cross-modulation evaluator according to claim 2 in which said detecting and monitoring means includes a bandpass filter for passing a frequency range equal to one-half that of said narrow band of frequencies.

4. The cross-modulation evaluator according to claim 2 in which said sweeping means comprises a first sweep frequency oscillator, a first modulator for mixing said source current and the output of said first oscillator, a band-elimination filter for rejecting said narrow frequency band, means for applying the output of said first modulator to said filter, and a second modulator for mixing the output of said filter with the output of said first oscillator; and in which said detecting and monitoring means comprises a second sweep frequency oscillator, means for synchronizing said first and said second oscillators, a third modulator for mixing the output of said transducer and the output of said second oscillator, a band filter for passing said narrow frequency band, and means for applying the output of said third modulator to said last-mentioned filter.

5. Apparatus for simultaneously displaying on an oscilloscope screen the cross-modulation of all channels of a multichannel signal transmission system comprising a source of signals having frequencies extending over the operating range of said system and having substantially uniform amplitudes across said range, first filtering means having an elimination band limited substantially to a narrow frequency range comparable in width to a channel of said system and centered at a preselected frequency, means for translating the signal frequencies of said source into components having frequencies lying in a predetermined range above said operating range and cyclically sweeping said components across the input of said filtering means, means for translating the frequencies of the components in the output of said filtering means into components whose frequencies are equal to those of said source and applying said last-mentioned components to the input of said system, second filtering means located at the output of said system and having a passband comparable in width to said narrow frequency range and centered at the preselected frequency of said first filtering means, means at the output of said system for selecting the signal components therefrom, means for translating said last-mentioned signal components into a component having frequencies extending over said predetermined range and cyclically sweeping said last-mentioned components across the input of said second filtering means, means for detecting the components at the output of said second filtering means and displaying the detected components on an oscilloscope screen as a simultaneous visual representation of the cross-modulation in all channels of said system, and means for synchronizing said first-mentioned and last-mentioned translating means.

6. In cross-modulation measuring apparatus for simultaneously displaying on an oscilloscope screen the interchannel cross-modulation of all channels of a multichannel signal transmission system, means for generating a composite signal having predetermined frequencies equivalent to the operating frequency range of said system at substantially uniform amplitudes, means for translating said predetermined signal into certain components having frequencies increased above said predetermined frequencies, means for translating said certain components of increased frequencies into further components swept cyclically in increasing and decreasing numerical frequency directions across a range lying between said predetermined and increased frequencies, means for applying said swept further components across the input of filtering means whose rejection band is limited substantially to a frequency range equivalent to at least two channels of said system and centered at a preselected frequency, means for translating said swept further components of limited frequency range taken from the output of said filtering means into other components whose frequencies lie in a range equivalent to the frequencies of said certain components, means for translating said other components into components whose frequencies lie in a range equivalent to said predetermined frequencies and applying said last-mentioned components to the input of said system, filtering means connected to the output of said system for selecting therefrom said last-mentioned components whose frequencies are equivalent to said predetermined frequencies, means for translating said received components into first components whose frequencies are equivalent to those of said certain components, means for translating said first components into second components swept in increasing and decreasing numerical frequency directions in a range equivalent to that of said further components, means for applying said swept second components across the input of further filtering means whose passband is limited substantially to a frequency range equivalent to one channel of said system and centered at said preselected frequency of said first-mentioned filtering means, means for detecting the output of said further filtering means, means for displaying said last-mentioned detected output on an oscilloscope screen as a simultaneous visual representation of the cross-modulation in all channels of said system, and means for synchronizing said certain and first component translating means.

7. A cross-modulation evaluator for a multichannel broadband transmission system comprising a source of current containing all the frequencies in the transmission band of said system at substantially uniform amplitudes, means for translating the output of said source to a first higher frequency range, a first variable frequency oscillator tunable over a frequency range equal in width to said transmission band but displaced therefrom and adjusted to a preselected frequency adapted to the measurement of crosstalk introduced into a particular channel of said system, means for intermodulating the frequency components in said first frequency range with the output of said oscillator to produce frequency components in a second frequency range intermediate said transmission band and said first frequency range, a fixed narrow band rejection filter having a center frequency located at the mid-frequency of said second frequency range and a rejection band corresponding in width to a few channels of said system, means for applying the output of said intermodulating means to said filter, means for translating the output of said filter successively to said first frequency band and to said transmission band, means for applying the output of said last-mentioned translating means to the input of said system, and means for measuring the crosstalk energy in the output of a particular channel of said system comprising means for translating the output of said system to said first frequency range, a second variable frequency oscillator tunable over the same frequency range as said first oscillator and adjusted to said preselected frequency, means for intermodulating the output of said last-mentioned translating means with the output of said second oscillator to produce frequency components in said second frequency range, a fixed narrow band filter having a center frequency located at the mid-frequency of said second frequency range and a passband corresponding in width to approximately one channel of said system, means for applying the output of said intermodulating means to said last-mentioned filter, and means for detecting and indicating the energy passed by said last-mentioned filter.

8. Apparatus for generating a composite test signal for measuring the crosstalk energy in a single channel of a multichannel broadband transmission system comprising a broadband frequency source having frequency components of uniform amplitude extending over the operating frequency range of said system, a fixed frequency oscillator, a first modulator connected to said source and to said oscillator for translating the output of said source to a first higher frequency range of the same bandwidth as said operating frequency range but displaced therefrom as determined by the frequency of said oscillator, a first fixed bandpass filter for selecting from the output of said first modulator frequency components in said first frequency range, a variable frequency oscillator continuously and automatically swept over a frequency range numerically equal to said operating frequency range but displaced therefrom by a predetermined amount, a second modulator connected to the output of said first filter and said variable frequency oscillator for translating said operating frequency range from said first frequency range to a second frequency range intermediate said operating and first frequency ranges, said second frequency range having at least twice the bandwidth of said first frequency range whereby all frequency components of said first frequency range are continuously swept across said second frequency range, a second fixed frequency bandpass filter connected to the output of said second modulator for selecting frequency components lying in said second frequency range, a third fixed frequency filter connected to the output of said second filter and having a rejection band centered at the mid-frequency of said second frequency range and equal numerically to two channels of said system for effectively removing source frequency components from a two-channel band in said second frequency range and continuously moving with respect to the ends of said second frequency range, a third modulator connected to the output of said third filter and to an output of said variable frequency oscillator for translating the output of said third filter back to said first frequency range, a fourth fixed filter connected to the output of said third modulator for selecting components in said first frequency range, the output of said fourth filter including a moving two-channel slot from which all frequency components are removed, a fourth modulator connected to the output of said fourth filter and to an output of said fixed frequency oscillator for translating the output of said fourth filter to the operating frequency range of said system, and a fifth fixed filter having a passband equal to the operating frequency range of said system for selecting the slot-modulated composite test signal, and means for coupling the output of said fifth filter to said multichannel transmission system.

References Cited in the file of this patent

UNITED STATES PATENTS

| | | |
|---|---|---|
| 1,914,414 | Fairchild | June 20, 1933 |
| 2,700,133 | Pfleger | Jan. 18, 1955 |